(12) United States Patent
Hotta et al.

(10) Patent No.: US 8,521,176 B2
(45) Date of Patent: Aug. 27, 2013

(54) TRANSMISSION APPARATUS AND FREQUENCY FLUCTUATION COMPENSATION METHOD

(75) Inventors: Shingo Hotta, Kawasaki (JP);
Hiromichi Makishima, Kawasaki (JP);
Hiroyuki Honma, Kawasaki (JP);
Ichirou Yokokura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/436,796

(22) Filed: Mar. 30, 2012

(65) Prior Publication Data

US 2012/0302185 A1 Nov. 29, 2012

(30) Foreign Application Priority Data

May 26, 2011 (JP) .................................. 2011-117800

(51) Int. Cl.
*H04B 17/00* (2006.01)
(52) U.S. Cl.
CPC .................................. *H04B 17/004* (2013.01)
USPC ...................... 455/452.1; 455/67.11; 370/232; 370/322
(58) Field of Classification Search
CPC ..................................................... H04B 17/004
USPC .............. 455/422.1, 450, 452.1, 67.11, 57.7; 370/232, 235, 322, 328, 329, 395.51, 468; 709/224, 232
See application file for complete search history.

(56) References Cited

U.S. PATENT DOCUMENTS

| | | |
|---|---|---|
| 5,444,658 A | 8/1995 | Izawa et al. |
| 7,420,917 B2 | 9/2008 | Ishikawa et al. |
| 7,620,006 B2 * | 11/2009 | Olariu et al. .................. 370/322 |
| 7,792,033 B2 | 9/2010 | Ishikawa et al. |
| 7,855,960 B2 | 12/2010 | Hinosugi et al. |
| 7,908,390 B2 | 3/2011 | Takase et al. |
| 8,189,521 B2 * | 5/2012 | Iwamura et al. .............. 370/329 |
| 8,238,348 B2 * | 8/2012 | Hamasaki et al. ....... 370/395.51 |
| 2006/0098674 A1 | 5/2006 | Hamasaki et al. |
| 2009/0210553 A1 | 8/2009 | Takase et al. |
| 2010/0158519 A1 | 6/2010 | Dong et al. |
| 2011/0063978 A1 | 3/2011 | Hinosugi et al. |
| 2013/0072212 A1 * | 3/2013 | Nakamura et al. ......... 455/452.1 |

FOREIGN PATENT DOCUMENTS

| | | |
|---|---|---|
| JP | 03-049439 | 3/1991 |
| JP | 07-030529 | 1/1995 |
| JP | 07-264174 | 10/1995 |
| JP | 10-070549 | 3/1998 |
| JP | 10-313349 | 11/1998 |

(Continued)

*Primary Examiner* — Thanh Le
(74) *Attorney, Agent, or Firm* — Fujitsu Patent Center

(57) ABSTRACT

In a transmission apparatus, a comparison unit provides threshold values associated with an amount of data indicating a signal frequency, and compares an input parameter obtained by cumulatively adding a correction amount to the parameter with the threshold values. When the input parameter is within a range defined by the threshold values, a correction unit outputs a value of the input parameter. When the input parameter is out of the defined range, the correction unit outputs an associated one of the threshold values so as to eliminate an amount exceeding or falling short of the defined range, to thereby correct the input parameter. An addition unit detects the correction amount which is an amount of the immediately preceding value of the input parameter exceeding or falling short of the defined range, and cumulatively adds the correction amount to the input parameter used for the comparison of this time.

4 Claims, 15 Drawing Sheets

(56) References Cited

FOREIGN PATENT DOCUMENTS

| JP | 2005-039390 | 2/2005 |
| JP | 2006-135754 | 5/2006 |
| JP | 2006-333901 | 12/2006 |
| JP | 2008-017773 | 1/2008 |
| JP | 2008-167180 | 7/2008 |
| JP | 2009-182546 | 8/2009 |
| JP | 2009-212882 | 9/2009 |
| JP | 2010-541509 | 12/2010 |

* cited by examiner

FIG. 8

| 1 2 3 | 14 15 16 17 | | | | | | | 3824 |
|---|---|---|---|---|---|---|---|---|
| ■ ■ ■ | Cn | S | data | S | data | S | data | |
| ■ ■ ■ | Cn | data | S | data | S | data | | |
| ■ ■ ■ | Cn | S | data | S | data | S | data | |
| ■ ■ ■ | | data | S | data | S | data | | S |

TRANSMISSION APPARATUS AND FREQUENCY FLUCTUATION COMPENSATION METHOD

CROSS-REFERENCE TO RELATED APPLICATION

This application is based upon and claims the benefit of priority of the prior Japanese Patent Application No. 2011-117800, filed on May 26, 2011, the entire contents of which are incorporated herein by reference.

FIELD

The embodiment discussed herein is related to a transmission apparatus that performs signal transmission, and a frequency fluctuation compensation method for compensating for fluctuation in frequency.

BACKGROUND

Transmission techniques that support backbone networks of optical communication include an OTN (Optical Transport Network), which is standardized by the ITU-T (International Telecommunication Union Telecommunication Standardization Sector).

The OTN is a technique for accommodating client signals of SONET/SDH (Synchronous Optical Network/Synchronous Digital Hierarchy), Ethernet (registered trademark), or the like, to thereby generate a frame having a hierarchical structure, and performing WDM (Wavelength Division Multiplexing) transmission.

On the other hand, in recent years, there are increasing discussions of OTN evolution concerning how to accommodate various kinds of client signals while maintaining interoperability with the existing hierarchical structure to thereby realize efficient signal transmission.

One example of OTN evolution is a client signal-accommodating method using a LO (Lower Order)-ODU (Optical Channel Data Unit) and a HO (Higher Order)-ODU. This method improves flexibility of client signal accommodation by multiplexing and accommodating not only data signals of SONET/SDH, Ethernet, etc., but also e.g. signals having a frame structure, as client signals.

A frame for accommodating a client signal is called the LO-ODU, and a frame where the LO-ODU is stored is called as the HO-ODU. The LO-ODU is mapped in a payload area of the HO-ODU for transmission, and frame synchronization of the LO-ODU is detected for monitoring at a receiving end.

On the other hand, as a mapping method employed in accommodating a client signal in an ODU frame, a GMP (Generic Mapping Procedure) is standardized (ITU-T G.709/Y.1331). With the GMP, it is possible to accommodate a client signal with any bit rate less than the payload capacity of a frame into which the client signal is accommodated, and hence it is possible to support various client signals.

As a conventional technique, there has been proposed a mapping technique for the LO-ODU.

Japanese National Publication of International Patent Application No. 2010-541509

The GMP makes it possible to map (or demap) a client signal at a desired bit rate not higher than a payload capacity of a frame into which the client signal is accommodated, in a stepwise manner, but has no mechanism for detecting and reducing fluctuation in frequency (frequency deviation) of a transport signal during the mapping operation.

Therefore, in the OTN transmission apparatus, if the frequency of transport signals has a fluctuation exceeding the specification, the frequency fluctuation is propagated through transmission apparatuses by execution of mapping.

As described above, the conventional GMP method has a problem that even when a frequency fluctuation occurs during execution of mapping, the fluctuation is not compensated for at an intermediate pathway, and hence the frequency fluctuation is propagated to an apparatus at the other end, which degrades the transmission quality.

SUMMARY

According to an aspect of the invention, there is provided a transmission apparatus including a comparison unit configured to provide threshold values associated with a nominal frequency for a parameter corresponding to an amount of data indicative of a signal frequency, and compare an input parameter obtained by cumulatively adding a correction value to the parameter, with the threshold values, a correction unit configured to output a value of the input parameter when the input parameter is within a range defined by the threshold values, and output an associated one of the threshold values when the input parameter is out of the range defined by the thresholds so as to eliminate an amount exceeding or falling short of the range defined by the threshold values to thereby correct the input parameter, and an addition unit configured to detect the correction amount which is associated with an amount of an immediately preceding value of the input parameter exceeding or falling short of the range defined by the threshold values, and cumulatively add the correction amount to the input parameter which is to be compared with the threshold values this time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates GMP mapping;

DESCRIPTION OF EMBODIMENTS

Figure 1:
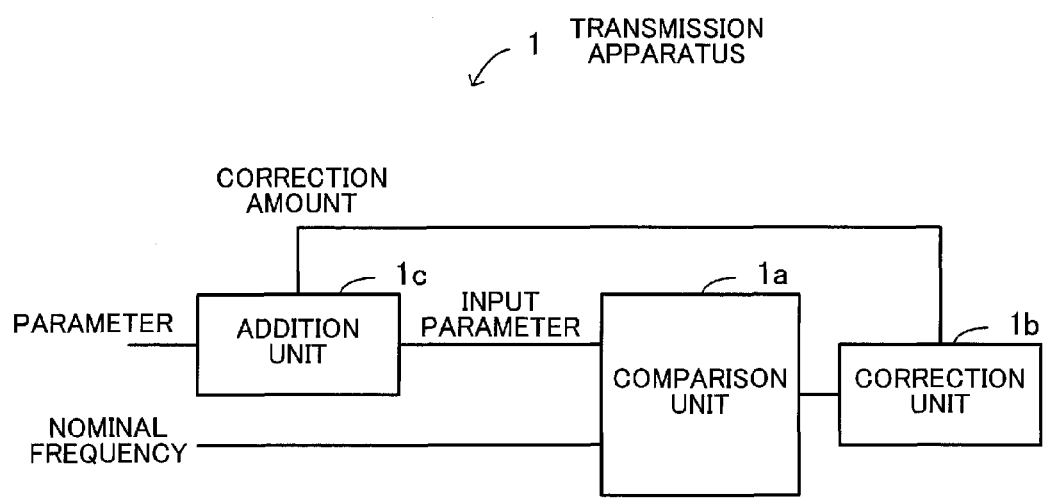
FIG. 1 illustrates an example of a configuration of a transmission apparatus.

Embodiments of the present invention will be explained below with reference to the accompanying drawings, wherein like reference numerals refer to like elements throughout. FIG. 1 illustrates an example of a configuration of a transmission apparatus. The transmission apparatus, denoted by reference numeral 1, includes a comparison unit 1a, a correction unit 1b, and an addition unit 1c.

The comparison unit 1a sets threshold values associated with a nominal frequency for a parameter corresponding to a data amount indicative of a signal frequency, and compares an input parameter formed by cumulatively adding a correction amount to the parameter and the threshold values.

When the input parameter is within a range defined by the threshold values, the correction unit 1b outputs a value of the input parameter, whereas when the input parameter is out of the range defined by the threshold values, the correction unit 1b outputs a value of an associated one of the threshold values such that an amount exceeding or falling short of the range defined by the threshold values is eliminated, to thereby correct the input parameter.

The addition unit 1c detects a correction amount which is an excess amount of the immediately preceding input parameter with respect to an associated one of the threshold values, and cumulatively adds the correction amount to an input parameter as the current target for comparison.

As mentioned above, the input parameter to which the correction amount is cumulatively added and the threshold values associated with the nominal frequency are compared, and when the input parameter is within the range defined by the threshold values, the value of the input parameter is output, whereas when the input parameter is out of the range defined by the threshold values, the value of the associated one of the threshold values is output to thereby correct the input parameter. This makes it possible to make the signal frequency fall within a valid range defined by the threshold values, and hence it is possible to prevent the frequency fluctuation from propagating to an apparatus at the other end.

Figure 2:
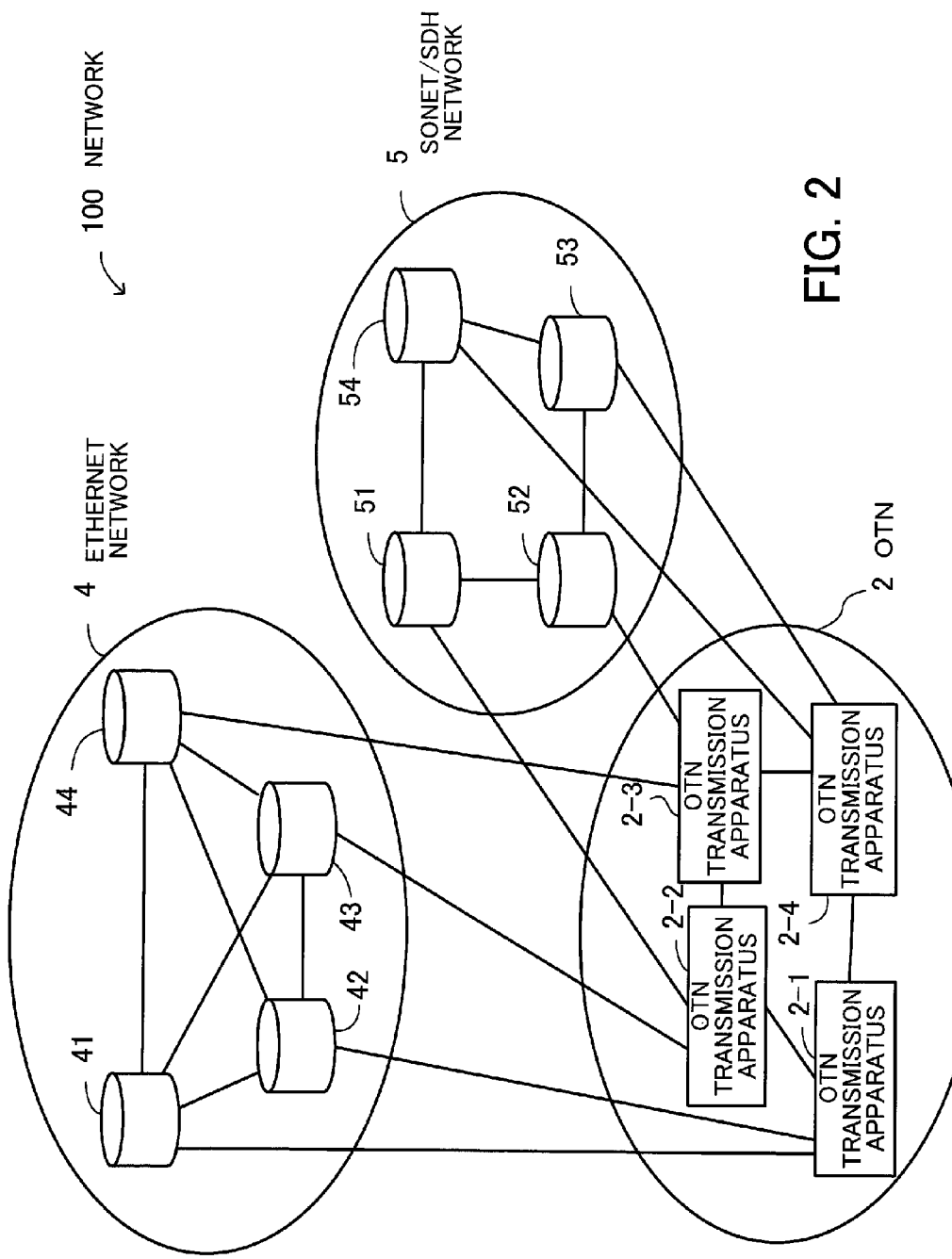
FIG. 2 illustrates an example of a network configuration.

Next, a description will be given hereinafter of an example in which the transmission apparatus 1 is applied to the OTN. First, the configuration of the OTN will be described. FIG. 2 illustrates an example of a network configuration. The network, denoted by reference numeral 100, includes the OTN, denoted by reference numeral 2, an Ethernet network 4, and a SONET/SDH network 5.

The Ethernet network 4 includes switches 41 to 44, which are connected in a meshed arrangement. The SONET/SDH network 5 includes ADMs (Add/Drop Multiplexers) 51 to 54, which are connected in a ring arrangement. The OTN 2 includes OTN transmission apparatuses 2-1 to 2-4, which are connected in a ring arrangement.

Further, the OTN transmission apparatus 2-1 is connected to the switches 41 and 42, the OTN transmission apparatus 2-2 is connected to the switch 43 and the ADM 51, the OTN transmission apparatus 2-3 is connected to the switch 44 and the ADM 52, and the OTN transmission apparatus 2-4 is connected to the ADMs 53 and 54.

Figure 3:
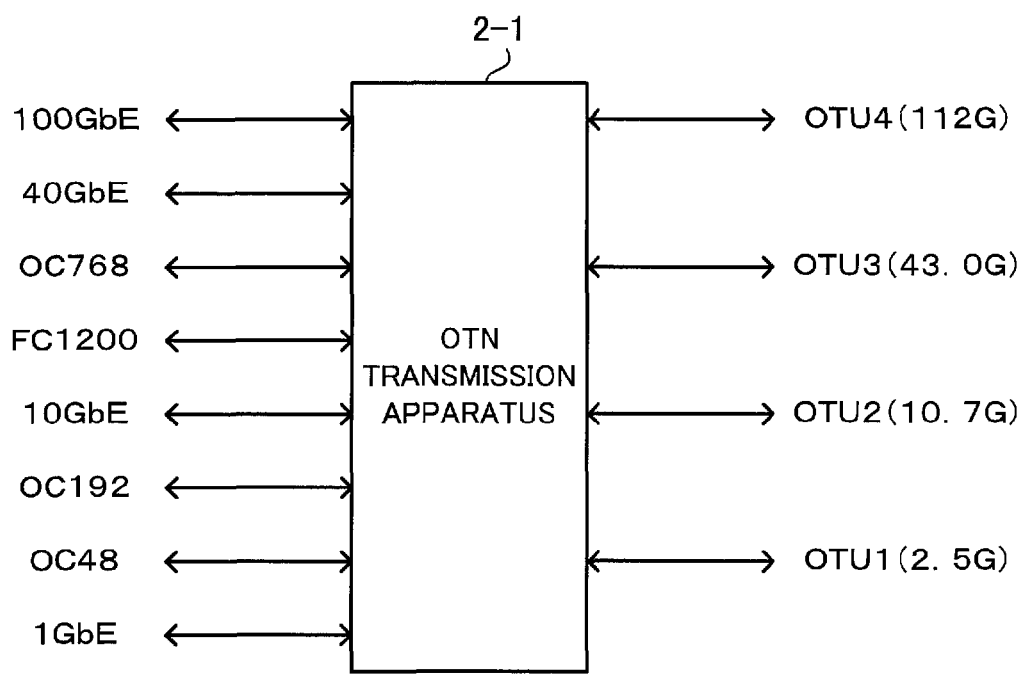
FIG. 3 illustrates an example of connection interfaces.

FIG. 3 illustrates an example of connection interfaces. The OTN transmission apparatus 2-1 includes client-side interfaces and network-side interfaces (the OTN transmission apparatuses 2-2 to 2-4 also each include the same connection interfaces).

The client-side interfaces are connection interfaces with the Ethernet network 4 or the SONET/SDH network 5, and the network-side interfaces are interfaces within the OTN 2.

The OTN transmission apparatus 2-1 has, for example, 100 GbE (Gigabit Ethernet), 40 GbE, OC (Optical Channel) 768, FC (Fiber Channel) 1200, 10 GbE, OC192, OC48, and 1 GbE interfaces, as the client-side interfaces.

Further, the OTN transmission apparatus 2-1 has, for example, OTU (Optical Channel Transport Unit) 4 (112G), OTU3 (43.0G), OTU2 (10.7G), and OTU1 (2.5G) interfaces, as the network-side interfaces.

Figure 4:
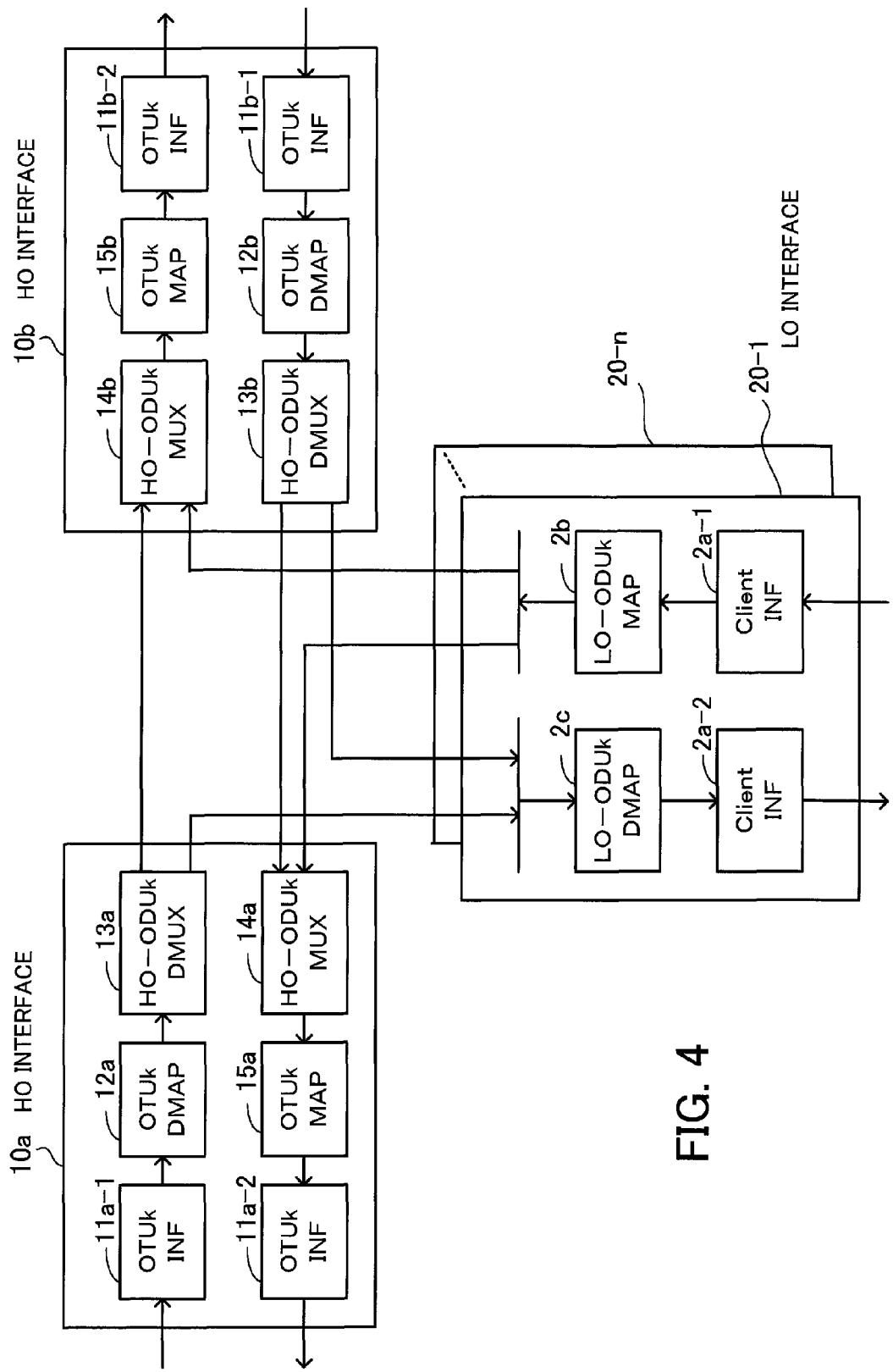
FIG. 4 illustrates an example of the configuration of the OTN transmission apparatus.

FIG. 4 illustrates an example of the configuration of the OTN transmission apparatus. The OTN transmission apparatus 2-1 has HO interface units 10a and 10b, and LO interface units 20-1 to 20-n, and has an ADM (Add/Drop Multiplexer) function (the OTN transmission apparatuses 2-2 to 2-4 each have the same configuration).

The LO interface units 20-1 to 20-n each include client-side interfaces 2a-1 and 2a-2, an LO-ODUk mapping unit 2b, and an LO-ODUk demapping unit 2c.

The HO interface unit 10a includes OTUk interfaces 11a-1 and 11a-2, an OTUk demapping unit 12a, an HO-ODUk demultiplexing unit 13a, an HO-ODUk multiplexing unit 14a, and an OTUk mapping unit 15a.

The HO interface 10b includes OTUk interfaces 11b-1 and 11b-2, an OTUk demapping unit 12b, an HO-ODUk demultiplexing unit 13b, an HO-ODUk multiplexing unit 14b, and an OTUk mapping unit 15b.

In each of the LO interface units 20-1 to 20-n, the client-side interface 2a-1 performs processing for receiving a client signal. The LO-ODUk mapping unit 2b maps the received client signal to an LO-ODUk.

The LO-ODUk demapping unit 2c demaps the received LO-ODUk to a client signal. The client-side interface 2a-2 performs processing for transmitting the client signal.

In the HO interface unit 10a, the OTUk interface 11a-1 performs processing for receiving an OTUk. The OTUk demapping unit 12a demaps the received OTUk to an HO-ODUk. The HO-ODUk demultiplexing unit 13a demultiplexes the received HO-ODUk and outputs an LO-ODUk.

The HO-ODUk multiplexing unit 14a multiplexes the received LO-ODUk and maps the multiplexed LO-ODUk to an HO-ODUk. The OTUk mapping unit 15a maps the received HO-ODUk to an OTUk. The OTUk interface 11a-2 performs processing for transmitting the OTUk.

In the HO interface 10b, the OTUk interface 11b-1 performs processing for receiving an OTUk. The OTUk demapping unit 12b demaps the received OTUk to an HO-ODUk. The HO-ODUk demultiplexing unit 13b demultiplexes the received HO-ODUk and outputs an LO-ODUk.

The HO-ODUk multiplexing unit 14b multiplexes the received LO-ODUk and maps the multiplexed LO-ODUk to an HO-ODUk. The OTUk mapping unit 15b maps the received HO-ODUk to an OTUk. The OTUk interface 11b-2 performs processing for transmitting the OTUk.

Figure 5:
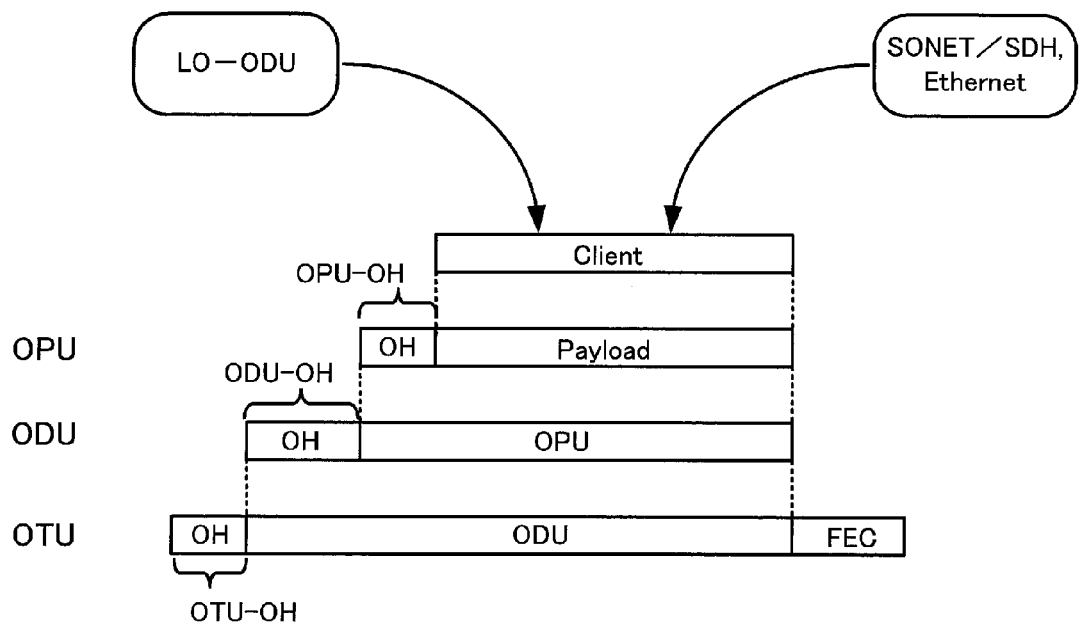
FIG. 5 illustrates a hierarchical structure of an OTN frame.

Next, a description will be given of the OTN frame configuration. FIG. 5 illustrates a hierarchical structure of an OTN frame. The OTN frame has a hierarchical structure, and the frames are referred to as the OPU (Optical Channel Payload Unit) frame, the ODU (Optical Channel Data Unit) frame, and the OTU (Optical Channel Transport Unit) frame from the lowest layer to the highest layer.

The OPU frame has a structure in which a client signal, such as a SONET/SDH signal or an Ethernet signal, is mapped into payload and overhead (OH) as control information is added to the payload.

Further, the ODU frame has a structure in which overhead is added to the OPU frame. Further, the OTU frame has a structure in which overhead and forward error correction (FEC) are added to the ODU frame.

Note that it is possible to accommodate not only data signals, such as SONET/SDH and Ethernet signals, but also LO-ODU frames, in the payload, as client signals.

Figure 6:
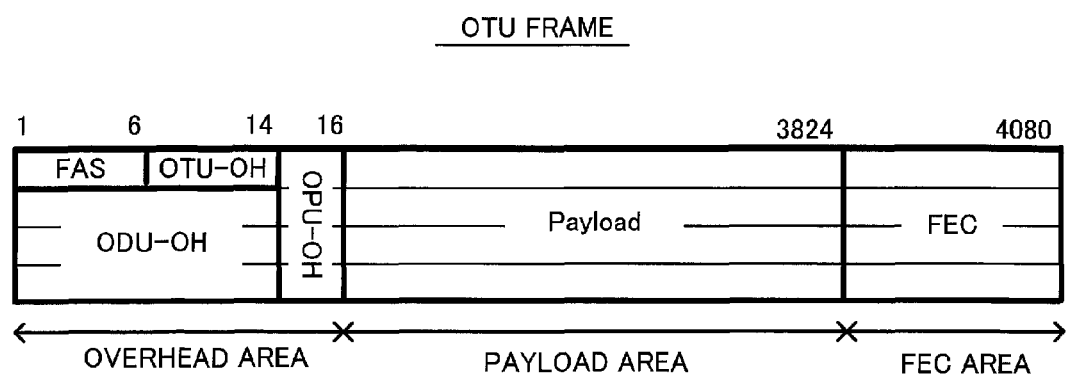
FIG. 6 illustrates an OTU frame format.

FIG. 6 illustrates an OTU frame format. The OTU frame has an overhead area, a payload area, and en FEC area.

The overhead area has a frame size of 16 bytes in first to 16th columns×4 rows, the payload area has a frame size of 3808 bytes in 17th to 3824th columns×4 rows, and the FEC area has a frame size of 256 bytes in 3825th to 4080th columns×4 rows.

The overhead area contains OPU-OH which is the overhead of the OPU frame, ODU-OH which is the overhead of the ODU frame, and OTU-OH which is the overhead of the OTU frame. The overhead area further contains a FAS (Frame Alignment Signal) indicating the head of the frame.

The FAS is arranged in the first to sixth columns on the first row, and the OTU-OH is arranged in the seventh to 14th columns on the first row. The ODU-OH is arranged in the first to 14th columns on the second to fourth rows, and the OPU-OH is arranged in the 15th to 16th columns on the first to fourth rows.

Figure 7:
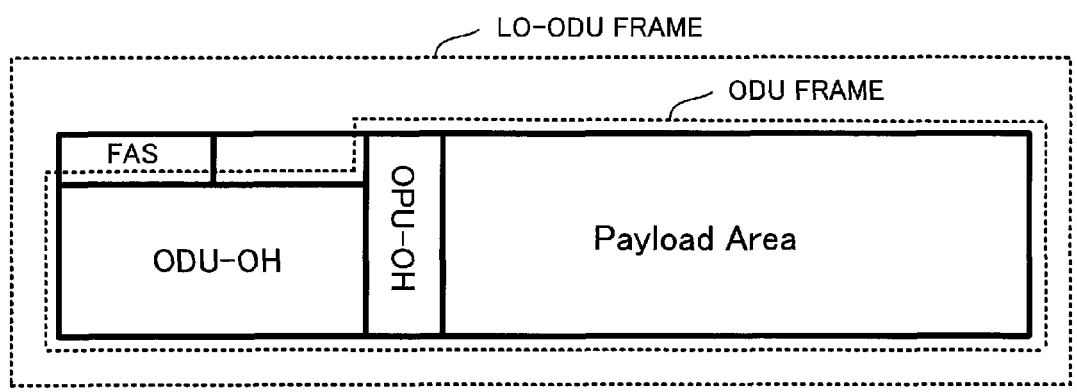
FIG. 7 illustrates an LO-ODU frame format.

FIG. 7 illustrates an LO-ODU frame format. The LO-ODU frame has an overhead area and a payload area. The LO-ODU has a frame format in which the FAS is added to the ODU frame and the overhead area contains the FAS, the ODU-OH, and the OPU-OH.

Note that the HO-ODU frame format in which the LO-ODU is mapped is the same as the frame format of the ODU frame (the overhead area contains the ODU-OH and the OPU-OH).

Next, a description will be given of an example of GMP mapping. FIG. 8 illustrates GMP mapping. GMP mapped data in the OPU frame is illustrated.

Part of the overhead of the OPU stores control parameters used for the GMP. The control parameters include an amount of data stored in the payload area and timing information on the data. Further, in the GMP, data and stuff are mapped such that the stuff is almost uniformly distributed in the payload area.

At the receiving end of the OPUk or ODTUk frame (hereinafter referred to as the server frame), destuffing is performed based on information contained in the OPU overhead, whereby the same client signal as transmitted from the transmitting end is restored.

Further, a Cn parameter in FIG. 8 is a theoretical value of the data amount of the client signal to be transmitted using the payload area of the OPU frame which accommodates the client signal. The Cn parameter is determined based on a difference in frequency between the client signal and the server frame, and expresses a data amount of an accommodated client signal in units of n bits.

Although in the GMP, not only the Cn parameter but also a Cm parameter and a Cnd parameter are calculated, detailed definition and calculation method for these parameters will be described hereinafter.

Figure 9:
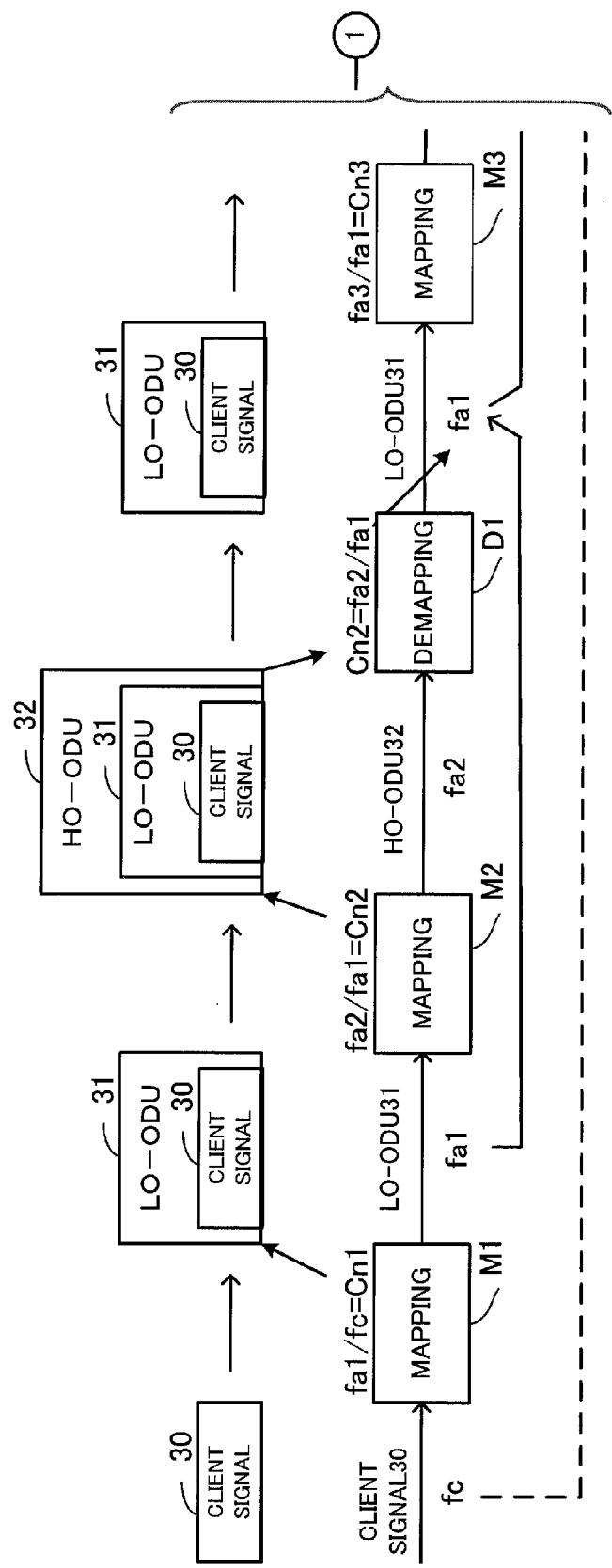
FIG. 9 is a diagram useful in explaining frequency propagation.
Figure 10:
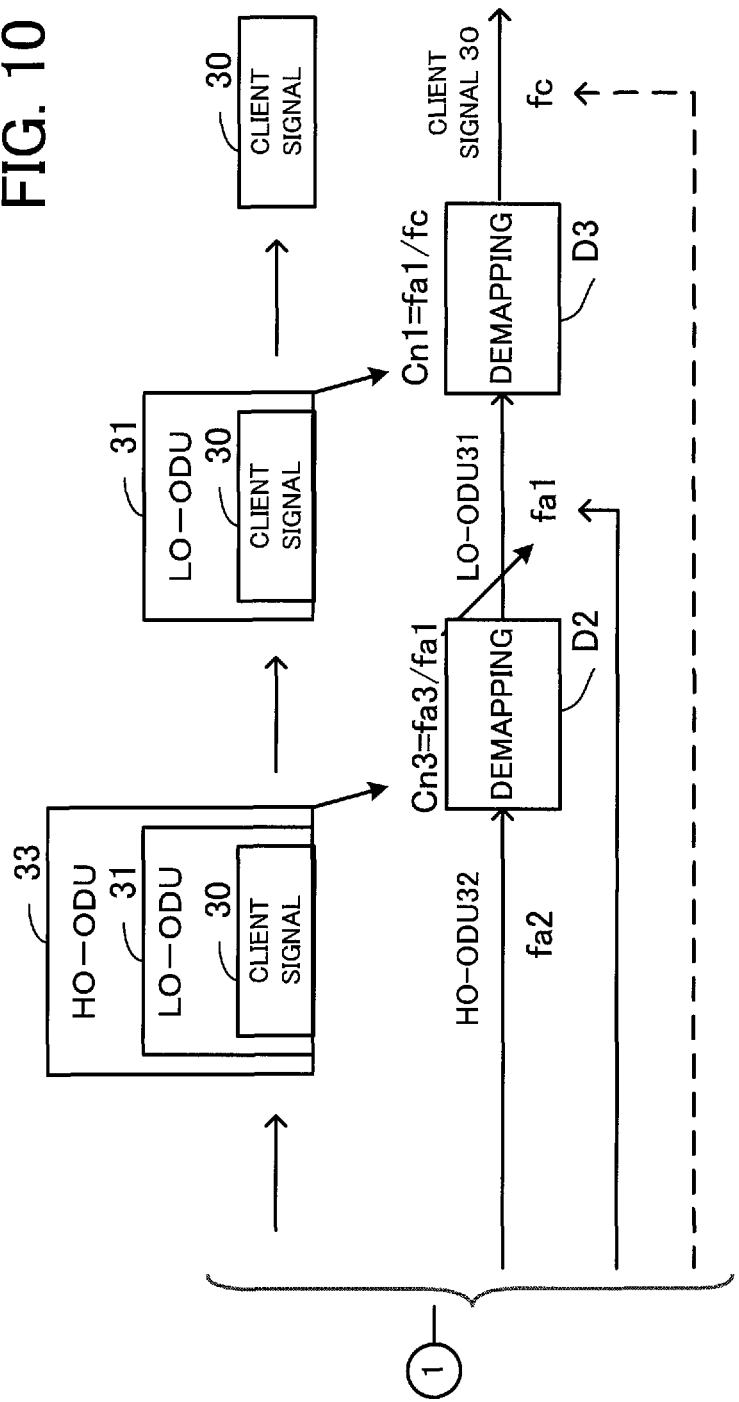
FIG. 10 is a diagram useful in explaining frequency propagation.

Next, a description will be given of frequency propagation caused by the GMP and the resulting problem. FIGS. 9 and 10 are diagrams useful in explaining frequency propagation. Note that for the sake of simplicity, in the following description, Cn, which represents the Cn parameter, is calculated as a simplified value obtained by dividing the frequency of a higher-order frame by the frequency of a lower-order frame (details of the method of calculating Cn will be described hereinafter).

[Mapping M1] A first OTN transmission apparatus maps a client signal 30 having a frequency of fc to an LO-ODU 31 which is a higher-order frame having a frequency of fa1. In doing this, a parameter Cn1 which is a ratio between fc and fa1 (fa1÷fc) is calculated, and is stored in the overhead of the LO-ODU 31. Therefore, the LO-ODU 31 includes information of the parameter Cn1.

[Mapping M2] The first OTN transmission apparatus further maps the LO-ODU 31 having a frequency of fa1 to an HO-ODU 32 which is a higher-order frame having a frequency of fa2. In doing this, a parameter Cn2 (=fa2÷fa1) which is a ratio between fa1 and fa2 is calculated and is stored in the overhead of the HO-ODU 32, and the HO-ODU 32 is output from the first OTN transmission apparatus. The LO-ODU 32 includes information of the parameter Cn2.

[Demapping D1] A second OTN transmission apparatus receives the HO-ODU 32 having the frequency fa2 which is transmitted from the first OTN transmission apparatus. Since the overhead of the HO-ODU 32 includes the parameter Cn2, it is possible to determine the frequency fa1 of the LO-ODU 31 from the frequency fa2 of the HO-ODU 32 and the parameter Cn2 by inverse calculation. This enables the second OTN transmission apparatus to generate an LO-ODU 31 by demapping the HO-ODU 32.

[Mapping M3] The second OTN transmission apparatus maps the LO-ODU 31 having the frequency fa1 to an HO-ODU 33 which is a higher-order frame having a frequency of fa3. At this time, a parameter Cn3 (=fa3÷fa1) which is a ratio between fa1 and fa3 is calculated and is stored in the overhead of the HO-ODU 33, and the HO-ODU 33 is output from the second OTN transmission apparatus. The HO-ODU 33 includes information of the parameter Cn3.

[Demapping D2] A third OTN transmission apparatus receives the HO-ODU 33 having the frequency fa3 which is transmitted from the second OTN transmission apparatus. Since the overhead of the HO-ODU 33 includes the parameter Cn3, it is possible to determine the frequency fa1 of the LO-ODU 31 from the frequency fa3 of the HO-ODU 33 and the parameter Cn3 by inverse calculation. This enables the third OTN transmission apparatus to generate the LO-ODU 31 by demapping the HO-ODU 33.

[Demapping D3] The parameter Cn1 is included in the overhead of the LO-ODU 31, which enables the third OTN transmission apparatus to determine the frequency fc of the client signal 30 from the frequency fa1 of the LO-ODU and the parameter Cn1 by inverse calculation. This enables the third OTN transmission apparatus to generate the client signal 30 by demapping the LO-ODU 31.

As described above, it is possible to perform a mapping operation from a lower-order frame to a higher-order frame, or a demapping operation from a higher-order frame to a lower-order frame by the GMP, and perform frequency conversion processing.

However, even when a failure, such as a frequency fluctuation, occurs during a mapping or demapping operation, the conventional GMP is not configured to compensate for the failure, and hence the frequency fluctuation is not prevented from propagating.

For example, let it be assumed that a fluctuation exceeding ±100 ppm is generated in the clock frequency of a client signal to be transmitted from the client apparatus to the OTN transmission apparatus. The OTN transmission apparatus is assumed to have tolerance to a fluctuation in frequency of a signal, and the client signal is mapped to a higher-order frame by the GMP and transmitted into the network.

Further, the OTN transmission apparatus demaps the higher-order frame to the lower-order frame to generate a client signal, and transmits the generated client signal to a client apparatus.

In this case, the client signal transmitted to the client apparatus at the receiving end has a fluctuation in frequency exceeding ±100 ppm due to frequency propagation. When the client apparatus at the receiving end does not have tolerance to the frequency fluctuation, an error is detected by the client apparatus.

As described above, in the conventional GMP, even when a frequency fluctuation occurs during the mapping or demapping operation, the fluctuation is not compensated for at an intermediate pathway, and hence the frequency fluctuation propagates to an apparatus at the other end, which degrades the transmission equality.

Further, although in this example, it is assumed that the frequency fluctuation occurs at the stage of output from the client apparatus at the transmitting end, a transport signal is transmitted through a plurality of OTN transmission apparatuses and the mapping/demapping operation is repeatedly performed on the transport signal, and hence when the frequency fluctuation is propagated due to the conventional GMP, it is difficult to detect a location where the frequency fluctuation occurs.

The present technique has been made in view of this, and provides a transmission apparatus which suppresses propagation of a frequency fluctuation to thereby improve the transmission quality, and the frequency fluctuation compensating method.

Figure 11:
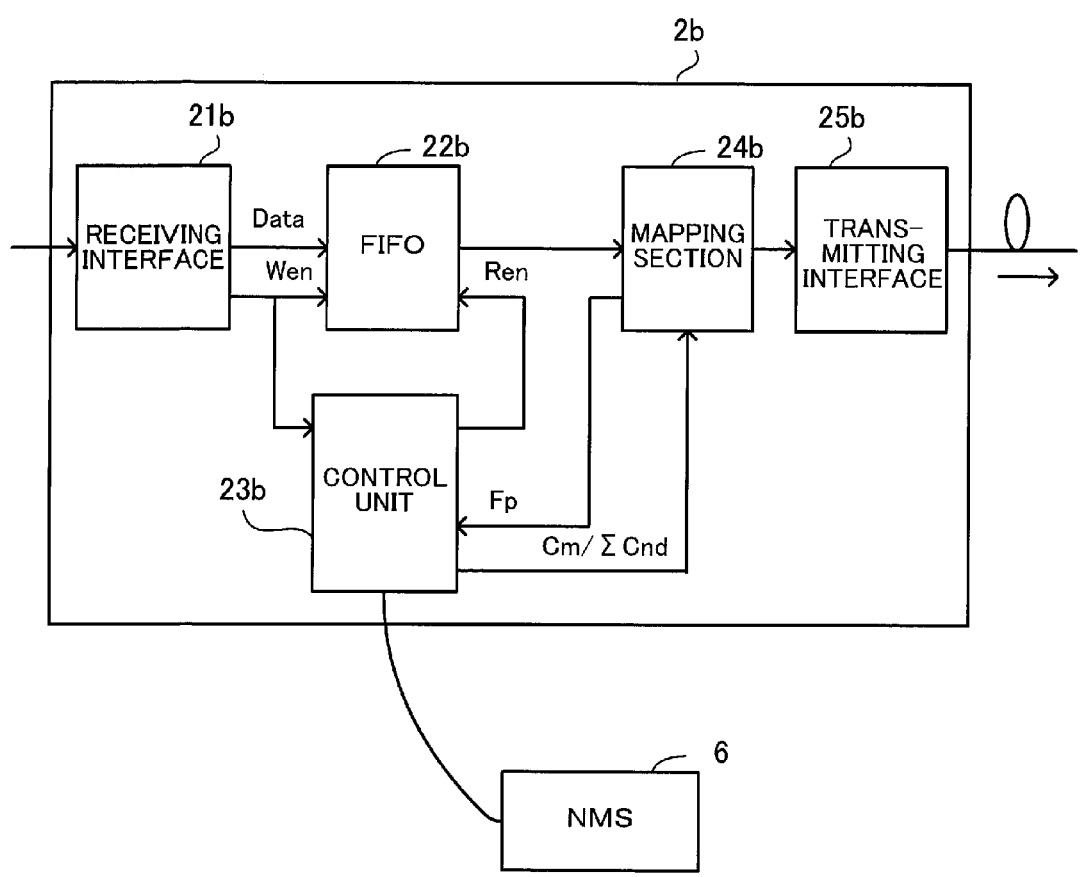
FIG. 11 illustrates an example of a configuration of an LO-ODUk mapping unit.

Next, a description will be given of the configuration and operation of the LO-ODUk mapping unit 2b and the LO-ODUk demapping unit 2c illustrated in FIG. 4. FIG. 11 illustrates an example of the configuration of the LO-ODUk mapping unit. The LO-ODUk mapping unit 2b includes a receiving interface 21b, a FIFO (First In First Out) 22b, a control unit 23b, a mapping section 24b, and a transmitting interface 25b.

A NMS (Network Management System) 6 is connected to the control unit 23b, and it is possible to set control information or recognize the operating condition of the LO-ODUk mapping unit 2b via the NMS 6.

The receiving interface 21b performs processing for receiving a client signal. The FIFO 22b stores the client signal output from the receiving interface 21b based on write enable Wen transmitted from the receiving interface 21b.

Figure 13:
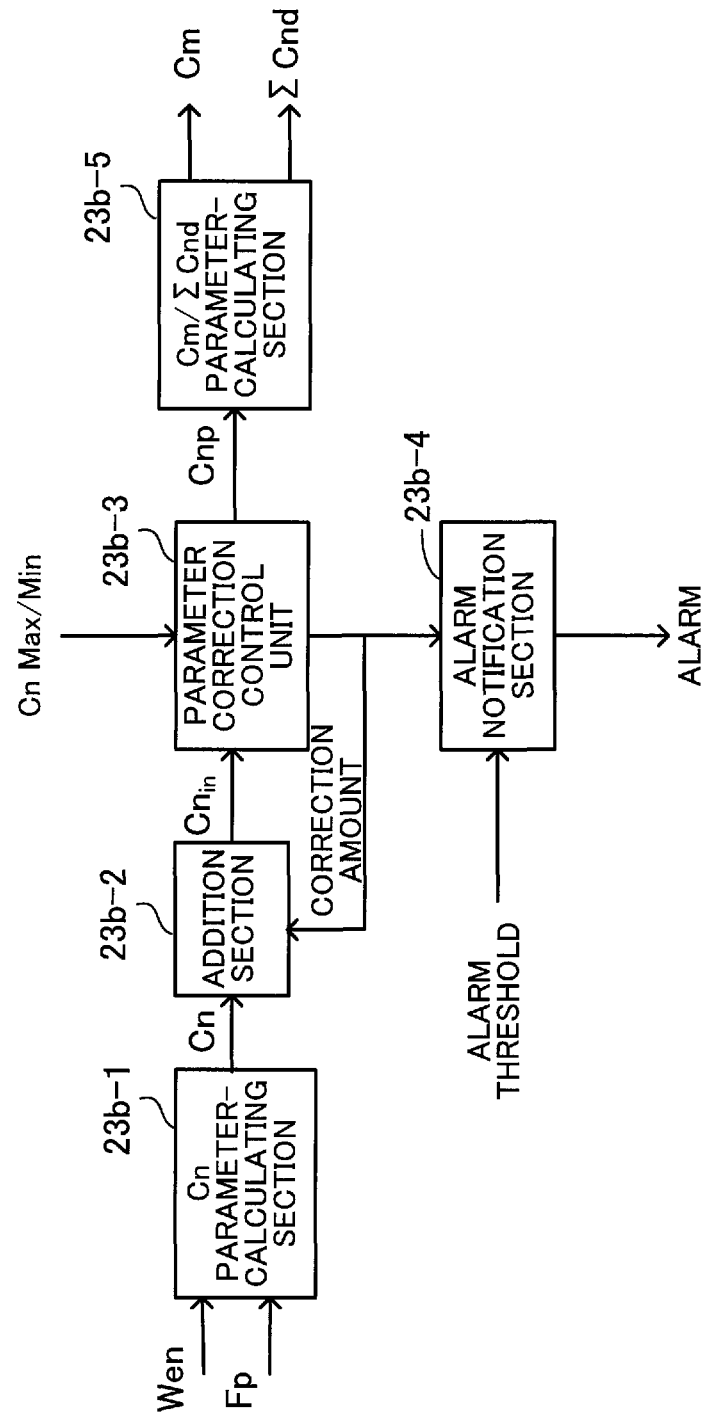
FIG. 13 illustrates an example of a configuration of a control unit.

The control unit 23b receives the write enable Wen and a frame pulse Fp and performs processing for correcting the parameter Cn (described hereinafter with reference to FIG. 13 et seq.). Further, the control unit 23b outputs read enable Ren, a parameter Cm, and a parameter accumulation Cnd (ΣCnd).

The FIFO 22b outputs the client signal based on the read enable Ren. The mapping section 24b maps the client signal to a higher-order frame. Further, the mapping section 24b inserts the control parameters of the parameter Cm and the parameter ΣCnd into the overhead of the higher-order frame. The transmitting interface 25b performs processing for transmitting the higher-order frame output from the mapping section 24b.

Figure 12:
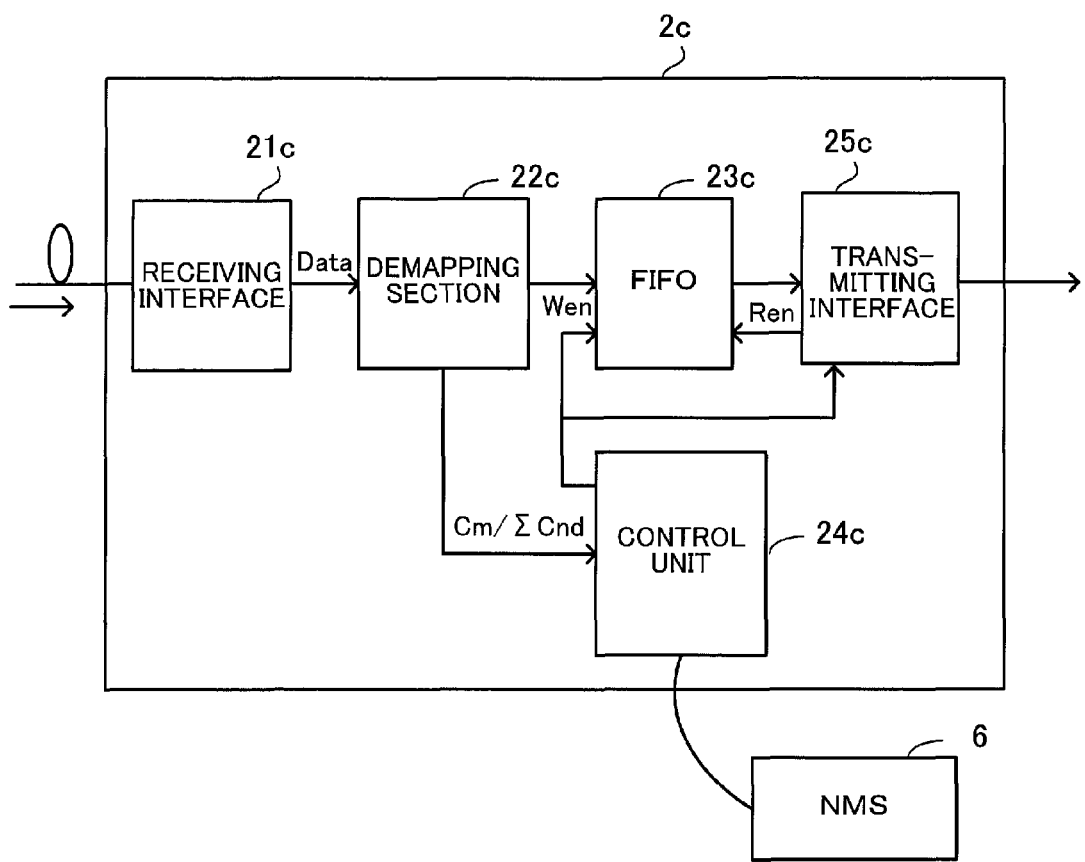
FIG. 12 illustrates an example of a configuration of an LO-ODUk demapping unit.

FIG. 12 illustrates an example of the configuration of the LO-ODUk demapping unit. The LO-ODUk demapping unit 2c includes a receiving interface 21c, a demapping section 22c, a FIFO 23c, a control unit 24c, and a transmitting interface 25c.

Note that the NMS 6 is connected to the control unit 24c, and it is possible to set control information or recognize the operating condition of the LO-ODUk demapping unit 2c via the NMS 6.

The receiving interface 21c performs processing for receiving a higher-order frame. The demapping section 22c demaps the higher-order frame to a lower-order frame. The FIFO 23c stores the lower-order frame based on write enable Wen transmitted from the control unit 24c.

The control unit 24c performs destuffing based on the Cm parameter and the ΣCnd parameter output from the demapping section 22c. The transmitting interface 25c performs processing for transmitting the lower-order frame output from the FIFO 23c.

Next, a description will be given of the configuration of the control unit 23b of the LO-ODUk mapping unit 2b illustrated in FIG. 11. FIG. 13 illustrates an example of the configuration of the control unit 23b. The control unit 23b includes a Cn parameter-calculating section 23b-1, an addition section 23b-2, a parameter correction control unit 23b-3, an alarm notification section 23b-4, and a Cm/ΣCnd parameter-calculating section 23b-5.

Note that the addition unit 1c illustrated in FIG. 1 corresponds to the addition section 23b-2. Further, the functions of the comparison unit 1a and the correction unit 1b are included in the parameter correction control unit 23b-3.

The Cn parameter-calculating section 23b-1 receives the write enable Wen of a client signal and the frame pulse Fp indicative of a frame period of the server frame (OPUk or OPTDUk) to be accommodated, and recognizes the number of clocks (or the number of writing operations into the FIFO) of the client signal per frame period to thereby calculate the Cn parameter.

The Cn parameter corresponds to a data amount (expressed in units of n bits) of the client signal to be accommodated in the server frame, which is calculated from the frequencies of the server frame and the client signal.

Now, a method of calculating the Cn parameter will be described. A symbol fclient represents a bit rate and bit tolerance of a client signal, and a symbol fserver represents payload of an OPUk or a bit rate and bit tolerance of an ODTU (Optical channel Data Tributary Unit) k.

Further, a symbol Bserver represents payload of an OPUk or a bit rate of the ODTUk (Bserver changes according to a type of the OPUk or the ODTUk), n represents an integer value, and t represents a t-th frame. The Cn parameter is calculated by the following equation (1) (int(x) represents an integer part of x):

$$Cn(t)=\text{int}((f\text{client}/f\text{server})\times(B\text{server}/n)) \quad (1)$$

Note that n is predetermined for each client signal, and basically, n=8. For client signals OC3, OC12, and OC48, n=1 is set. For example, when the client signal is OC48, the period of the server frame is 1 second, and each frequency fluctuation is 0, C1=2488320 and C8=311040 are obtained.

Referring again to FIG. 13, the addition section 23b-2 adds the Cn parameter and a correction amount output from the parameter correction control unit 23b-3 to generate and output a $Cn_{in}$ parameter (input parameter).

The parameter correction control unit 23b-3 receives a maximum value (Cn Max) and a minimum value (Cn Min) of the $Cn_{in}$ parameter, which correspond to the threshold values of the nominal frequency. Note that the threshold values of Cn Max and Min are set from the NMS.

Further, rounding (smoothing) of the $Cn_{in}$ parameter is performed by setting a valid range between the maximum value and the minimum value, and the corrected $Cn_{in}$ parameter (hereinafter referred to as the Cnp parameter) is output.

Here, a method of calculating the thresholds Cn Max and Cn Min (valid range of the $Cn_{in}$ parameter) will be described. It is possible to calculate thresholds Cn Max and Cn Min from an averaged frequency (averaged bit rate) and a frequency deviation of the client signal, and an averaged frequency and a frequency fluctuation of the server frame, which are defined by standards of the client signal and the server frame.

An example of calculation of the thresholds Cn Max and Cn Min used when mapping the client signal 1 GbE to the OPU0 is expressed by the following equations:

$$C8\max=(fc+100\text{ ppm})/(fs-20\text{ ppm})\times15232=14409.04 \quad (2a)$$

$$C8\min=(fc-100\text{ ppm})/(fs+20\text{ ppm})\times15232=14405.58 \quad (2b)$$

From the equation (2a)m, by raising a decimal fraction, C8 max=14410 is obtained, and from the equation (2b), by ignoring a decimal fraction, C8 min=14405 is obtained. Note that fc represents a bit rate of the client signal, and fs represents a bit rate of payload of the OPU0. Further, 15232 represents the number of bytes of the payload of the OPU0.

Referring again to FIG. 13, the alarm notification section 23b-4 stores the correction amount at a time when the $Cn_{in}$ parameter is corrected by the parameter correction control unit 23b-3. Then, based on an alarm threshold provided from the outside, when the stored correction amount exceeds the alarm threshold, the alarm notification section 23b-4 outputs an alarm (Cn Out Of Range).

The output alarm is notified to an operator via the NMS. The correction amount corresponds to a value obtained by subtracting the maximum value or the minimum value from the $Cn_{in}$ parameter to be input to the parameter correction control unit 23b-3, and corresponds to an amount exceeding or falling short of the valid range.

A protection stage number for eliminating the possibility of generation of an alarm due to a calculation error in the Cn value calculated using the GMP are set as the alarm threshold. For example, in a case where the Cn calculation error is generated within ±1 due to the accuracy in the GMP calculation, to output an alarm when the correction value is not smaller than 2, the alarm threshold is set to 2.

The Cm/ΣCnd parameter-calculating section 23b-5 calculates the Cm parameter and the ΣCnd parameter from the corrected Cnp parameter output from the parameter correction control unit 23b-3.

The Cm parameter is a value which expresses the Cn parameter in units of M bytes (m=8×M). M is predetermined for each client signal, and for example, M=1 is set for the client signal 1 GbE, M=2 is set for the client signal OC48, and M=80 is set for the client signal 100 GbE. Therefore, when the client signal is OC48, the period of the server frame is 1 second, and the frequency deviation is equal to 0, Cm=C8/2=155520 is obtained.

A method of calculating the Cm parameter is expressed by the following equation (3):

$$Cm(t)=\text{int}((f\text{client}/f\text{server})\times((B\text{server}/8)/M)) \quad (3)$$

On the other hand, the Cnd parameter is a value of a difference between the Cn parameter and the Cm parameter. When the above Cm parameter is calculated, the Cm parameter becomes a value obtained by dividing the Cn parameter by M and ignoring a decimal fraction (the obtained value is represented by Cm'), and hence a difference is generated between Cn and Cm'×M. The generated difference is the Cnd parameter.

For example, assuming that Cn=101 and M=2 are set, Cm'=101÷2≈50 is obtained, and hence Cn−Cm'×M=101−50×2=1 is obtained, i.e. Cnd=1 is obtained.

A method of calculating the Cnd parameter is expressed by the following equation (4):

$$Cnd=Cn(t)-(((8\times M)/n)\times Cm(t)) \quad (4)$$

Further, a value obtained by cumulatively calculating the Cnd parameter whenever each server frame period elapses is ΣCnd (however, when ΣCnd becomes not smaller than M, M is subtracted from ΣCnd, and the value of Cm is set to Cm'+1).

The values of the Cm parameter and the ΣCnd parameter calculated by the Cm/ΣCnd parameter-calculating section 23b-5 are stored in JC (Justification Control) bytes in the overhead of the server frame and are transferred, as control data for performing demapping processing at the receiving end of the server frame.

Figure 14:
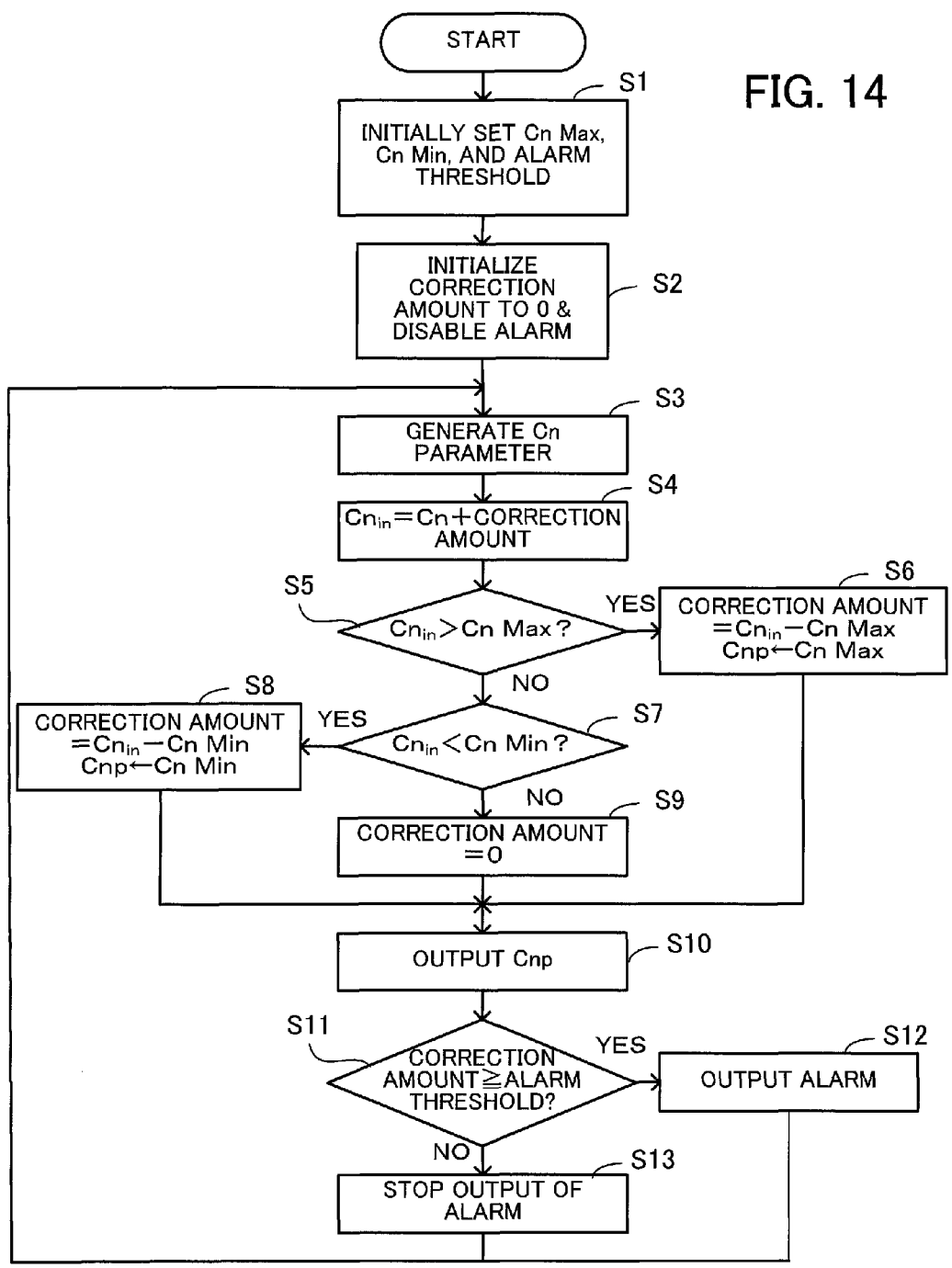
FIG. 14 is a flowchart illustrating an operation of parameter correction control.

Next, a description will be given of the operation of parameter correction control. FIG. 14 is a flowchart illustrating the operation of the parameter correction control.

[S1] The thresholds Cn Max and Cn Min and the alarm threshold are set from the NMS.

[S2] The alarm notification section 23b-4 performs initialization operation immediately after the start or recovery of the operation. More specifically, the alarm notification section 23b-4 sets a stored amount of the correction amount to 0, and disables an alarm.

[S3] The Cn parameter-calculating section 23b-1 generates a Cn parameter.

[S4] The addition section 23b-2 adds the received Cn parameter and the correction amount, and outputs the value of the resulting sum as the $Cn_{in}$ parameter.

[S5] The parameter correction control unit 23b-3 determines whether or not the $Cn_{in}$ parameter exceeds the maximum value Cn Max. If the $Cn_{in}$ parameter exceeds the maximum value, the process proceeds to a step S6, whereas if not, the process proceeds to a step S7.

[S6] The parameter correction control unit 23b-3 sets an amount exceeding the maximum value Cn Max as a correction amount (=$Cn_{in}$−Cn Max). Further, the parameter correction control unit 23b-3 sets the maximum value Cn Max as the Cnp parameter (Cnp←Cn Max). Then, the process proceeds to a step S10.

[S7] The parameter correction control unit 23b-3 determines whether or not the $Cn_{in}$ parameter falls short of the minimum value Cn Min. If the $Cn_{in}$ parameter falls short of the minimum value, the process proceeds to a step S8, whereas if not, the process proceeds to a step S9.

[S8] The parameter correction control unit 23b-3 sets an amount falling short of the minimum value Cn Min as a correction amount (=$Cn_{in}$−Cn Min). Further, the parameter correction control unit 23b-3 sets the minimum value Cn Min as the Cnp parameter (Cnp←Cn Min). Then, the process proceeds to the step S10.

[S9] If the $Cn_{in}$ parameter does not fall short of the minimum value Cn Min, and does not exceed the maximum value Cn Max (if the $Cn_{in}$ parameter is within the valid range defined by the minimum value Cn Min and the maximum value Cn Max), the parameter correction control unit 23b-3 sets the current correction amount to 0.

[S10] The parameter correction control unit 23b-3 outputs the Cnp parameter.

[S11] The alarm notification section 23b-4 determines whether or not the correction amount is not smaller than the alarm threshold. If the correction amount is not smaller than the alarm threshold, the process proceeds to a step S12, whereas if not, the process proceeds to a step S13.

[S12] The alarm notification section 23b-4 outputs an alarm by enabling the alarm.

[S13] The alarm notification section 23b-4 stops the output of the alarm by disabling the alarm.

As described above, the $Cn_{in}$ parameter to which the correction amount is added is compared with the thresholds Cn Max and Cn Min, and when the $Cn_{in}$ parameter is within the range defined by the thresholds Cn Max and Cn Min, the value of the $Cn_{in}$ parameter is output, whereas the $Cn_{in}$ parameter is out of the range defined by the thresholds Cn Max and Cn Min, the value of the threshold Cn Max or the threshold Cn Min is output to thereby correct the $Cn_{in}$ parameter. This suppresses the fluctuation in the signal frequency, and hence it is possible to suppress propagation of the frequency fluctuation to the apparatus at the other end.

Further, it is possible to notify an alarm before occurrence of underflow/overflow (out of OTN transmission apparatus tolerance range) in the FIFO of the apparatus at the other end, which makes it possible to notify the apparatus at the other end of a data break in advance. Further, alarm notification enables the operator to recognize an apparatus where a frequency fluctuation exceeding permitted tolerance occurs during mapping and demapping e.g. via the NMS.

Note that in the above description, the correction amount accumulated in the Cn parameter is used for determination of the alarm notification, whereby it is made possible to prevent erroneous notification of the alarm which might be caused by a calculation error of the Cn parameter.

Here, if the frequency of the client signal is counted simply by counting the frequency of the higher-order frame, it is possible to calculate Cn within the expected range for each frame.

However, if intermediate processing is needed after a client signal is received and before the client signal is mapped to the higher-order frame, enable control and transfer of the client signal to an intermediate clock signal are to be performed, and hence there is a possibility that the counted Cn might exceed (or fall short of) the expected range. For example, the 1 GbE client signal is needed to be subjected to 64B/65B encoding before mapping the client signal to the ODU0 frame.

The margin of calculation error is different depending on the configuration of intermediate processing, and hence the alarm threshold with respect to the correction amount accumulated in the Cn parameter is externally set so as to make it possible to variably set the alarm threshold according to the margin of calculation error, whereby erroneous notification of an alarm, which may be caused by the calculation error, is suppressed.

Figure 15:
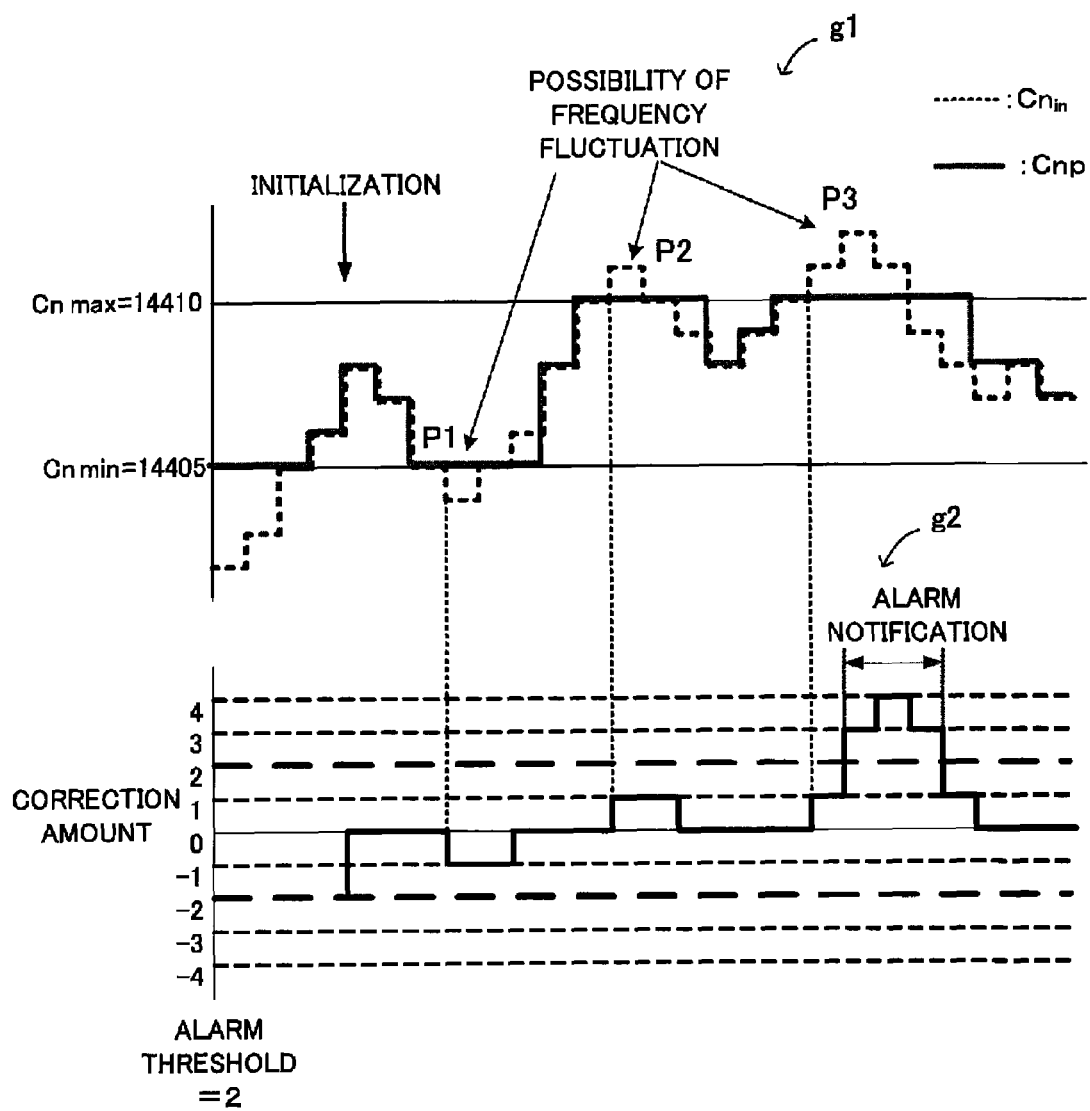
FIG. 15 illustrates a correspondence between a change in a parameter and a correction amount.

Next, a description will be given of a correspondence between a change in the Cnp parameter and the correction amount. FIG. 15 illustrates the correspondence between a change in the parameter and the correction amount. A graph g1 illustrates changes in the Cnp parameter, the vertical axis represents the $Cn_{in}$ value, and the horizontal axis represents time. Further, in the graph g1, a dotted-line waveform represents the $Cn_{in}$ parameter, and a solid-line waveform represents the Cnp parameter. A graph g2 illustrates changes in the correction amount, the vertical axis represents the correction amount, and the horizontal axis represents time.

The example illustrated in FIG. 15 corresponds to a case where a 1 GbE client signal is mapped to OPU0, and it is assumed that Cn Max=14410 and Cn Min=14405 are set, and the alarm threshold is set to 2. Points P1 to P3 where frequency fluctuation occurs will be investigated.

First, at the point P1, when the correction amount is equal to 0, the $Cn_{in}$ parameter is equal to 14404, and hence the correction amount=−1 is calculated, whereby the Cnp parameter=14405 is obtained. The correction amount is within the range between the upper limit value and the lower limit value of the alarm threshold, and hence the alarm notification is not performed.

At the point P2, when the correction amount is equal to 0, the $Cn_{in}$ parameter is equal to 14411, and hence the correction amount=+1 is calculated, whereby the Cnp parameter=14410 is obtained. The correction amount is within the range between the upper limit value and the lower limit value of the alarm threshold, and hence the alarm notification is not performed.

At the point P3, when the correction amount is equal to 0, as the $Cn_{in}$ parameter changes to 14411 and then 14412, and hence the correction amount changes to +1 and then +3 accordingly, so that the alarm notification is performed. Thereafter, when the $Cn_{in}$ parameter continues to change to 14411, 14409, and then 14408, the correction amount changes to +4, +3, and then +1, accordingly, so that the alarm is cancelled.

According to the embodiment, it is possible to suppress propagation of frequency fluctuation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A transmission apparatus comprising,
  a comparison unit configured to provide threshold values associated with a nominal frequency for a parameter corresponding to an amount of data indicative of a signal frequency, and compare an input parameter obtained by cumulatively adding a correction value to the parameter, with the threshold values;
  a correction unit configured to output a value of the input parameter when the input parameter is within a range defined by the threshold values, and output an associated one of the threshold values when the input parameter is out of the range defined by the thresholds so as to eliminate an amount exceeding or falling short of the range defined by the threshold values to thereby correct the input parameter; and
  an addition unit configured to detect the correction amount which is associated with an amount of an immediately preceding value of the input parameter exceeding or falling short of the range defined by the threshold values, and cumulatively add the correction amount to the input parameter which is to be compared with the threshold values this time.

2. The transmission apparatus according to claim 1, further comprising an alarm notification unit, and
  wherein the alarm notification unit is provided with an alarm threshold, and performs alarm notification when a cumulatively added value of the correction amount exceeds the alarm threshold.

3. A frequency fluctuation compensation method comprising:
  providing threshold values associated with a nominal frequency, for a parameter corresponding to a signal frequency, comparing an input parameter obtained by cumulatively adding a correction amount to the parameter with the threshold values;

outputting a value of the input parameter when the input parameter is within a range defined by the threshold values, and outputting an associated one of the threshold values when the input parameter is out of the range defined by the threshold values to thereby correct the input parameter; and detecting the correction amount which is associated with an amount of an immediately preceding value of the input parameter exceeding or falling short of the range defined by the threshold values, and cumulatively adding the correction amount to the input parameter which is to be compared with the threshold values this time.

4. The frequency fluctuation compensation method according to claim 3, wherein an alarm threshold is provided, and wherein when a cumulatively added value of the correction value exceeds the alarm threshold, alarm notification is performed.

* * * * *